United States Patent
Hao et al.

(10) Patent No.: US 11,067,010 B2
(45) Date of Patent: Jul. 20, 2021

(54) METHOD AND DEVICE FOR DETERMINING COMBUSTION NOISE PARAMETERS

(71) Applicant: SAIC MOTOR Corporation Limited, Shanghai (CN)

(72) Inventors: Jingxian Hao, Shanghai (CN); Weiping Yuan, Shanghai (CN); Endong Song, Shanghai (CN); Xiangtai Song, Shanghai (CN); Kai Yang, Shanghai (CN); Huaihan Ye, Shanghai (CN); Chungen Luo, Shanghai (CN); Lifeng Zhang, Shanghai (CN); Haidong Xin, Shanghai (CN); Aihua Hu, Shanghai (CN); Liangliang Qiao, Shanghai (CN); Ming Sun, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 0 days.

(21) Appl. No.: 15/931,900

(22) Filed: May 14, 2020

(65) Prior Publication Data
US 2021/0087986 A1 Mar. 25, 2021

(30) Foreign Application Priority Data
Sep. 24, 2019 (CN) .......................... 201910906988.0

(51) Int. Cl.
F02D 35/02 (2006.01)
F02D 41/00 (2006.01)

(52) U.S. Cl.
CPC ......... *F02D 35/027* (2013.01); *F02D 35/023* (2013.01); *F02D 41/009* (2013.01)

(58) Field of Classification Search
CPC ..... F02D 35/027; F02D 35/023; F02D 41/009
See application file for complete search history.

(56) References Cited

U.S. PATENT DOCUMENTS 5,692,404 A * 12/1997 Kirii ..................... B21D 24/00
72/15.1

FOREIGN PATENT DOCUMENTS

DE 102013109889 A1 6/2014
DE 102015210616 A1 4/2016
(Continued)

OTHER PUBLICATIONS

Extended European Search Report and Search Opinion for EP Application No. 20174770.6, dated Oct. 15, 2020.

*Primary Examiner* — Gonzalo Laguarda
(74) *Attorney, Agent, or Firm* — Nixon Peabody LLP; Thomas P. Pavelko

(57) ABSTRACT

A method and a device for determining combustion noise parameters, comprising acquiring a cylinder pressure sequence which comprises cylinder pressures corresponding to different crank angles φ and corresponding moments $t_φ$; calculating a first parameter sequence according to the cylinder pressure sequence, wherein the first parameter sequence is a parameter sequence in a time domain, and the first parameter sequence comprises one or more of a top surface cylinder force sequence, a top surface cylinder force rise rate sequence, a side surface cylinder force sequence and a side surface cylinder force rise rate sequence; and determining a target parameter for representing combustion noise in the cylinder according to the first parameter sequence.

10 Claims, 6 Drawing Sheets

(56) References Cited

FOREIGN PATENT DOCUMENTS

| DE | 102017204579 A1 | 3/2018 |
|----|-----------------|--------|
| EP | 1316704 A2 | 6/2003 |
| WO | 2007091735 A1 | 8/2007 |

\* cited by examiner

```
                ┌──────────────────────────────────────────────────────────┐
                │  Obtaining a corresponding third parameter sequence       │──S701
                │         according to the second parameter sequence        │
                └──────────────────────────────────────────────────────────┘
                                            │
                                            ▼
                ┌──────────────────────────────────────────────────────────┐
                │  Performing frequency weighting on the third parameter    │──S702
                │  sequence to determine a target parameter for representing│
                │            combustion noise in the cylinder               │
                └──────────────────────────────────────────────────────────┘
```

Figure 7

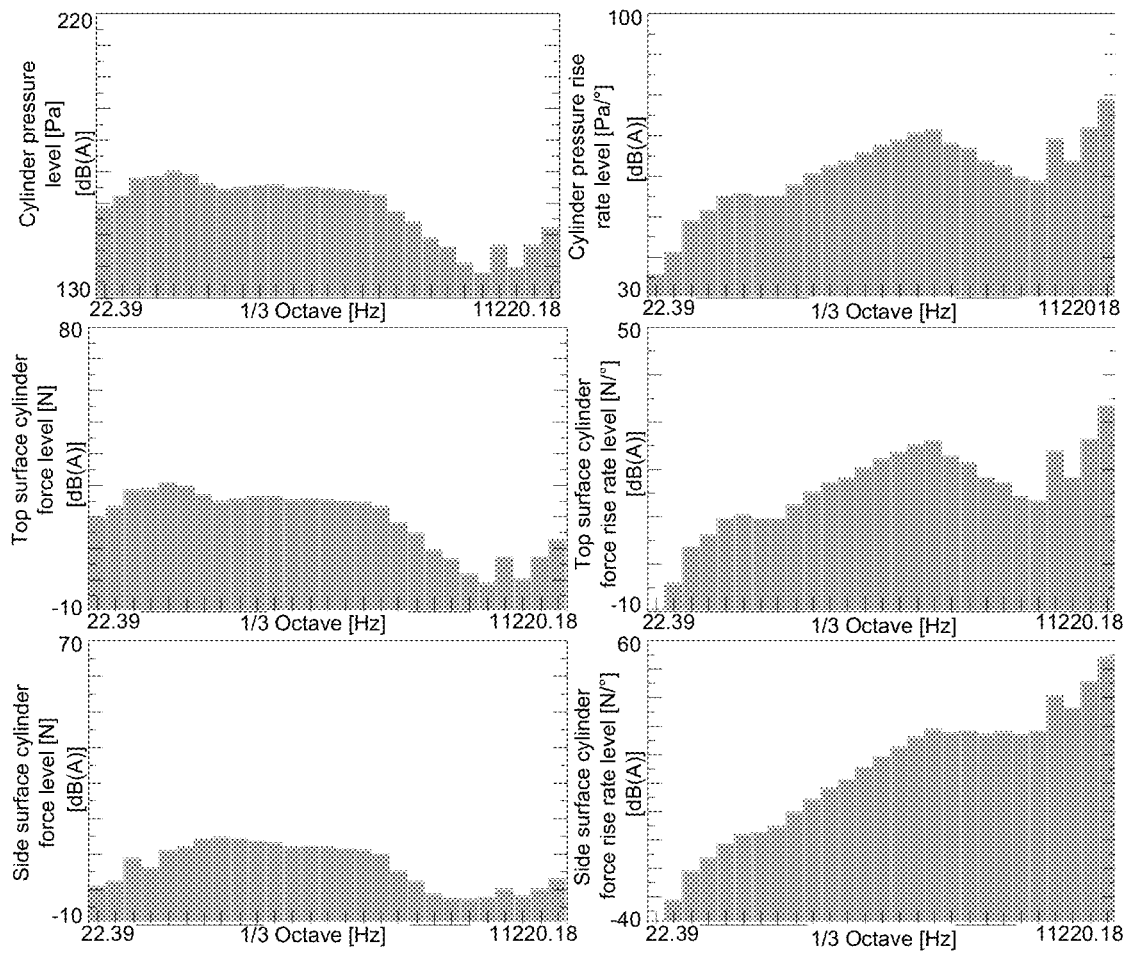

Figure 8

METHOD AND DEVICE FOR DETERMINING COMBUSTION NOISE PARAMETERS

CROSS-REFERENCE TO RELATED PATENT APPLICATION

This application claims the benefit of Chinese Patent Application No. 201910906988.0, filed Sep. 24, 2019, the entire contents of which are hereby incorporated by reference in their entirety.

FIELD OF THE INVENTION

The application relates to the field of noise detection, in particular to a method and a device for determining combustion noise parameters.

BACKGROUND

There is no uniform specification for describing the combustion noise in the cylinder of an automobile engine. At present, there are several commonly used representation methods in the world as follows: Liszt takes the cylinder pressure as the main representation parameter of combustion noise; Ricardo takes the cylinder pressure rise rate as the main representation parameter of combustion noise; FEV takes cylinder pressure and cylinder pressure rise rate as the main representation parameters of combined combustion noise; and there is also the application of cylinder pressure level and cylinder pressure rise rate level and other parameters to represent.

The cylinder pressure can refer to the pressure in the cylinder of the internal combustion engine, with the symbol $P_c$ and the unit Pascal (Pa). The cylinder pressure level may refer to the result obtained by multiplying the logarithm based on 10 by 10 after dividing the square of the cylinder pressure $P_c$ by the square of the reference sound pressure $P_0$, the calculation formula is $$L_{P_c} = 10\lg\left(\frac{P_c^2}{P_0^2}\right)$$

with the unit decibel (dB) and the reference sound pressure $P_0$ is 20 μPa; the cylinder pressure rise rate may refer to the cylinder pressure change per unit crank angle, with the symbol $\dot{P}_c$, and the calculation formula is $$\dot{P}_c = \frac{dP_c}{d\varphi},$$

with the unit Pascal per degree (Pa/°); the cylinder pressure rise rate level may refer to the result obtained by multiplying the logarithm based on 10 by 10 after the dividing the cylinder pressure rise rate $\dot{P}_c$ by the reference pressure rise rate $\dot{P}_{c0}$, with the symbol $L_{\dot{P}_c}$, the calculation formula is $$L_{\dot{P}_c} = 10\lg\left(\frac{\dot{P}_c^2}{\dot{P}_0^2}\right)$$

with the unit decibel (dB), and the reference sound pressure rise rate $\dot{P}_{c0}$ is $10^{-5}$ Pa/°.

In fact, these representation parameters only relate to the combustion process of the combustible gas itself, and do not relate to the excitation of the cylinder by the combustion of the combustible gas in the cylinder in the time course, thus making the representation parameters of the combustion noise not accurate and perfect.

Therefore, how to provide more accurate and perfect representation parameters of combustion noise is an urgent problem to be solved at present.

SUMMARY

In order to solve the above technical problems, the application provides a method and a device for determining combustion noise parameters, so that the determined target parameters representing combustion noise in a cylinder are more accurate and perfect.

The embodiment of the application discloses the following technical schemes:

The embodiment of the application provides a method for determining combustion noise parameters, which comprises the following steps:

acquiring a cylinder pressure sequence, wherein the cylinder pressure sequence comprises cylinder pressures corresponding to different crank angles φ and corresponding moments $t_\varphi$;

calculating a first parameter sequence according to the cylinder pressure sequence, wherein the first parameter sequence is a parameter sequence in a time domain, and the first parameter sequence comprises one or more of a top surface cylinder force sequence, a top surface cylinder force rise rate sequence, a side surface cylinder force sequence and a side surface cylinder force rise rate sequence;

wherein the top surface cylinder force in the top surface cylinder force sequence is $F_{top}=P_c \cdot S_{top}$, the top surface cylinder force rise rate in the top surface cylinder force rise rate sequence is $$\dot{F}_{top} = \frac{dF_{top}}{d\varphi},$$

the side surface cylinder force in the side surface cylinder force sequence is $F_{side}=P_c \cdot S_{side}$, the side surface cylinder force rise rate in the side surface cylinder force rise rate sequence is $$\dot{F}_{side} = \frac{dF_{side}}{d\varphi};$$

$S_{top}$ is an equivalent area of a cylinder top surface and $S_{side}$ is an equivalent area of a cylinder side surface; and determining a target parameter for representing combustion noise in a cylinder according to the first parameter sequence.

Optionally, determining the target parameter for representing combustion noise in the cylinder according to the first parameter sequence comprises:

calculating a second parameter sequence corresponding to the first parameter sequence in a frequency domain; and determining the target parameter for representing combustion noise in the cylinder according to the second parameter sequence.

Optionally, determining the target parameter for representing combustion noise in the cylinder according to the second parameter sequence comprises:

obtaining a corresponding third parameter sequence according to the second parameter sequence;

performing frequency weighting on the third parameter sequence to determine a target parameter for representing combustion noise in a cylinder;

wherein if the first parameter sequence comprises a top surface cylinder force sequence and/or a side surface cylinder force sequence, the third parameter sequence obtained by using $$L_F = 10\lg\left(\frac{F'^2}{F_0^2}\right)$$

comprises a corresponding top surface cylinder force level sequence and/or a side surface cylinder force level sequence, the target parameter comprises a corresponding top surface cylinder force value $L_{F_{top}}'$ and/or a side surface cylinder force value $L_{F_{side}}'$, and $F_0$ is a reference force;

if the first parameter sequence comprises a top surface cylinder force rise rate sequence and/or a side surface cylinder force rise rate sequence, the third parameter sequence obtained by using $$L_{\dot{F}} = 10\lg\left(\frac{\dot{F}'^2}{\dot{F}_0^2}\right)$$

comprises a corresponding top surface cylinder force rise rate sequence and/or a side surface cylinder force rise rate sequence, and the target parameter comprises a corresponding top surface cylinder force rise rate value $L_{\dot{F}_{top}}'$ and/or a side surface cylinder force rise rate value $L_{\dot{F}_{side}}'$, and $\dot{F}_0$ is a reference force rise rate.

Optionally, acquiring the cylinder pressure sequence comprises:

acquiring a first cylinder pressure sequence according to a target crank angle interval;

determining the cylinder pressure sequence according to the relationship between the crank angle and the corresponding moment;

or, acquiring a second cylinder pressure sequence according to a target time interval;

determining the cylinder pressure sequence according to the relationship between the crank angle and the corresponding moment.

Optionally, the method further comprises:

setting the position of the crankshaft when the highest cylinder pressure is reached for the first time in the cylinder as the position of the crank angle φ=0°, for the process of acquiring the first cylinder pressure sequence or the second cylinder pressure sequence.

The embodiment of the application also provides a device for determining combustion noise parameters, characterized in that the device comprises:

an acquisition unit configured to acquire a cylinder pressure sequence including cylinder pressures $P_c$ corresponding to different crank angles φ and corresponding moments $t_φ$;

a calculation unit configured to calculate a first parameter sequence according to the cylinder pressure sequence, wherein the first parameter sequence is a parameter sequence in a time domain, and the first parameter sequence comprises one or more of a top surface cylinder force sequence, a top surface cylinder force rise rate sequence, a side surface cylinder force sequence and a side surface cylinder force rise rate sequence;

wherein the top surface cylinder force in the top surface cylinder force sequence is $F_{top}=P_c \cdot S_{top}$, the top surface cylinder force rise rate in the top surface cylinder force rise rate sequence is $$\dot{F}_{top} = \frac{dF_{top}}{d\varphi},$$

the side surface cylinder force in the side surface cylinder force sequence is $F_{side}=P_c \cdot S_{side}$, and the side surface cylinder force rise rate in the side surface cylinder force rise rate sequence is $$\dot{F}_{side} = \frac{dF_{side}}{d\varphi};$$

$S_{top}$ is the equivalent area of the cylinder top surface and $S_{side}$ is the equivalent area of the cylinder side surface;

a determination unit configured to determine a target parameter for representing combustion noise in a cylinder according to the first parameter sequence.

Optionally, the determining unit is specifically configured to:

calculate a second parameter sequence corresponding to the first parameter sequence in a frequency domain;

determine a target parameter for representing combustion noise in the cylinder according to the second parameter sequence.

Optionally, the determining unit is further specifically configured to:

obtain a corresponding third parameter sequence according to the second parameter sequence;

perform frequency weighting on the third parameter sequence to determine a target parameter for representing combustion noise in a cylinder;

wherein if the first parameter sequence comprises a top surface cylinder force sequence and/or a side surface cylinder force sequence, the third parameter sequence obtained by using $$L_F = 10\lg\left(\frac{F'^2}{F_0^2}\right)$$

comprises a corresponding top surface cylinder force sequence and/or a side surface cylinder force sequence, the target parameter comprises a corresponding top surface cylinder force value $L_{F_{top}}'$ and/or a side surface cylinder force value $L_{F_{side}}'$, and $F_0$ is a reference force;

if the first parameter sequence comprises a top surface cylinder force rise rate sequence and/or a side surface cylinder force rise rate sequence, the third parameter sequence obtained by using $$L_{\dot{F}} = 10\lg\left(\frac{\dot{F}'^2}{\dot{F}_0^2}\right)$$

comprises a corresponding top surface cylinder force rise rate sequence and/or a side surface cylinder force rise rate sequence, and the target parameter comprises a corresponding top surface cylinder force rise rate value $L_{\dot{F}_{top}}'$ and/or a side surface cylinder force rise rate value $L_{\dot{F}_{top}}'$, wherein $\dot{F}_0$ is a reference force rise rate.

Optionally, the acquisition unit is specifically configured to:

acquire a first cylinder pressure sequence according to a target crank angle interval;

determine the cylinder pressure sequence according to the relationship between the crank angle and the corresponding moment;

or, acquire a second cylinder pressure sequence according to a target time interval;

determine the cylinder pressure sequence according to the relationship between the crank angle and the corresponding moment.

Optionally, the acquisition unit is specifically configured to:

set the position of the crankshaft when the highest cylinder pressure is reached for the first time in the cylinder as the position of the crank angle φ=0°, for the process of acquiring the first cylinder pressure sequence or the second cylinder pressure sequence.

As can be seen from the above technical scheme, a cylinder pressure sequence is obtained, and the cylinder pressure sequence comprises cylinder pressures $P_c$ corresponding to different crank angles φ and corresponding moments $t_\varphi$; calculating a first parameter sequence according to a cylinder pressure sequence, wherein the first parameter sequence is a parameter sequence in a time domain, and the first parameter sequence comprises one or more of a top surface cylinder force sequence, a top surface cylinder force rise rate sequence, a side surface cylinder force sequence and a side surface cylinder force rise rate sequence; the top surface cylinder force in top surface cylinder force sequence is $F_{top}=P_c \cdot S_{top}$, the top surface cylinder force rise rate in top surface cylinder force rise rate sequence is $$\dot{F}_{top} = \frac{dF_{top}}{d\varphi},$$

the side surface cylinder force in side surface cylinder force sequence is $F_{side}=P_c \cdot S_{side}$, the side surface cylinder force rise rate in side surface cylinder force rise rate sequence is $$\dot{F}_{side} = \frac{dF_{side}}{d\varphi};$$

$S_{top}$ is the equivalent area of the cylinder top surface, and $S_{side}$ is the equivalent area of the cylinder side surface; according to the first parameter sequence, a target parameter for representing combustion noise in the cylinder is determined. In the method, parameters such as top surface cylinder force, side surface cylinder force, top surface cylinder force rise rate and side surface cylinder force rise rate are added to further consider the excitation of the combustion of combustible gas in the cylinder to the cylinder in the time history, so that the determined target parameters representing the combustion noise in the cylinder are more accurate and perfect.

BRIEF DESCRIPTION OF THE DRAWINGS

In order to more clearly explain the embodiment of the application or the technical scheme in the prior art, the following will briefly introduce the drawings needed in the description of the embodiment or the prior art. Apparently, the drawings in the following description are only some embodiments of the application. For those of ordinary skill in the art, other drawings can be obtained according to these drawings without creative labor.

FIG. 7 is a flowchart of another method for determining a target parameter for representing combustion noise in a cylinder provided by an embodiment of the present application;

FIG. 8 is a schematic diagram for determining a comprehensive value corresponding to a combustion noise sound pressure level of a cylinder according to an embodiment of the present application;

DETAILED DESCRIPTION

Figure 1:
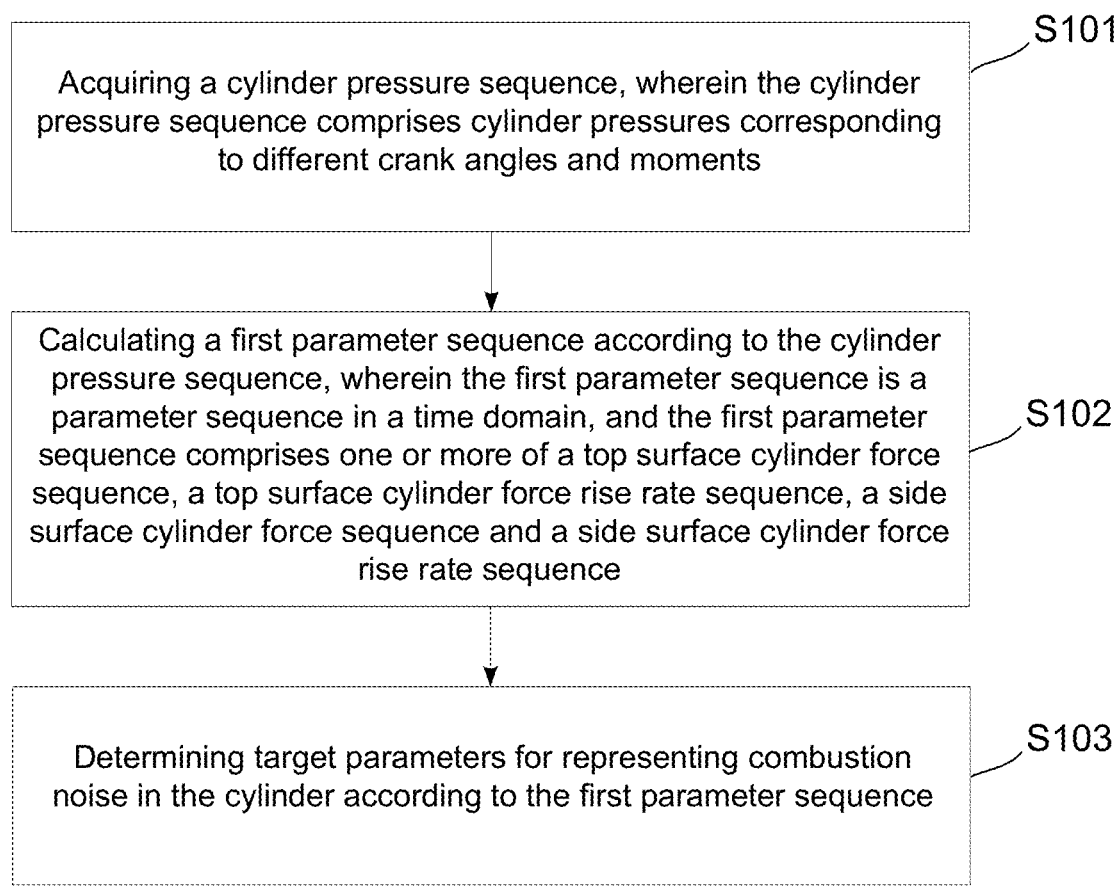
FIG. 1 is a flowchart of a method for determining combustion noise parameters provided by an embodiment of the present application.

Embodiments of the present application will be described below with reference to the accompanying drawings.

At present, the combustion noise in the cylinder of an automobile engine is mainly represented by parameters such as cylinder pressure, cylinder pressure level, cylinder pressure rise rate, cylinder pressure rise rate level and the like. These representation parameters only relate to the combustion process of combustible gas itself, and do not relate to the excitation of the cylinder by the combustion of combustible gas in the cylinder in the time course, thus causing the representation parameters of the combustion noise to be inaccurate and incomplete.

Therefore, the embodiment of the application provides a method for determining combustion noise parameters, a cylinder pressure sequence is obtained, and the cylinder pressure sequence comprises cylinder pressures $P_c$ corresponding to different crank angles φ and corresponding moments $t_\varphi$; calculating a first parameter sequence according to a cylinder pressure sequence, wherein the first parameter sequence is a parameter sequence in a time domain, and the first parameter sequence comprises one or more of a top surface cylinder force sequence, a top surface cylinder force rise rate sequence, a side surface cylinder force sequence and a side surface cylinder force rise rate sequence; the top surface cylinder force in top surface cylinder force sequence is $F_{top}=P_c \cdot S_{top}$, the top surface cylinder force rise rate in top surface cylinder force rise rate sequence is $$\dot{F}_{top} = \frac{dF_{top}}{d\varphi},$$

the side surface cylinder force in side surface cylinder force sequence is $F_{side}=P_c \cdot S_{side}$, the side surface cylinder force rise rate in side surface cylinder force rise rate sequence is $$\dot{F}_{side} = \frac{dF_{side}}{d\varphi},$$

$S_{top}$ is the equivalent area of the cylinder top surface, and $S_{side}$ is the equivalent area of the cylinder side surface; according to the first parameter sequence, a target parameter for representing combustion noise in the cylinder is determined. In the method, parameters such as top surface cylinder force, side surface cylinder force, top surface cylinder force rise rate and side surface cylinder force rise rate are added to further consider the excitation of the combustion of combustible gas in the cylinder to the cylinder in the time history, so that the determined target parameters representing the combustion noise in the cylinder are more accurate and perfect.

Next, various parameters involved in the embodiments of this application will be introduced.

Cylinder bore: the cylinder diameter of the engine, the symbol is D, and the unit is meters (m).

Crank length: the distance between the two ends of the crank and the center of the connecting position, the symbol is r, and the unit is meters (m).

Connecting rod length: the distance between the two ends of the connecting rod and the center of the connecting position, the symbol is L, and the unit is meters (m).

Piston stroke: the distance between top and bottom dead centers, the symbol is s, and the unit is meters (m).

Combustion chamber volume: when the piston is located at top dead center, the space formed above the top surface of the piston and below the bottom surface of the cylinder becomes the combustion chamber, and its volume is called the combustion chamber volume, the symbol is $V_c$ and the unit is cubic meters (m³).

Piston swept volume: the volume of the cylinder contained between the upper and lower dead centers, the symbol is $V_s$, and the unit is cubic meters (m³).

Cylinder total volume: the sum of the piston swept volume and the combustion chamber volume, the symbol is $V_a$, and the unit is cubic meters (m³).

Cylinder equivalent top area/cylinder equivalent bottom area: the projected area of the top/bottom surface of a single cylinder, the symbol is $S_{top}$, the calculation formula is $$S_{top} = \frac{\pi D^2}{4},$$

and the unit is square meters (m²).

Compression ratio: the ratio of the cylinder total volume to the combustion chamber volume, the symbol is ε, and the calculation formula is $$\varepsilon = \frac{V_a}{V_c} = 1 + \frac{V_s}{V_c}.$$

Equivalent clearance height: the ratio of combustion chamber volume to cylinder equivalent top area, the symbol is δ, and calculation formula is $$\delta = \frac{V_c}{S_t} = \frac{S}{\varepsilon - 1}.$$

Crankshaft angle: the angle at which the crankshaft turns after passing through a specified zero position for a period of time, the symbol is φ, and the unit is degrees (°).

Zero position of crankshaft angle: the crankshaft angle at the top dead center position of the crankshaft, the symbol is $\varphi_0$, i.e. $\varphi_0 = 0°$.

Cylinder side area: side area when a single cylinder works, the symbol is $S_{side}$, the calculation formula is $S_{side} = \pi D(\delta + l + r - r\cos\varphi - \sqrt{l^2 - r^2\sin^2\varphi})$, and the unit is square meters (m²).

Corresponding moment of crankshaft angle: the time elapsed from the zero position of crank angle to the crank angle φ, the symbol is $t_\varphi$, and the unit is seconds (s).

Cylinder pressure: the pressure in the cylinder of the internal combustion engine, the symbol is $P_c$, and the unit is Pascal (Pa).

Cylinder pressure level: the result obtained by multiplying the logarithm based on 10 by 10 after dividing the square of the cylinder pressure $P_c$ by the square of the reference sound pressure $P_0$, the calculation formula is $$L_{P_c} = 10\lg\left(\frac{P_c^2}{P_0^2}\right),$$

the unit is decibel (dB), and the reference sound pressure $P_0$ is 20 μPa.

Cylinder pressure rise rate: the cylinder pressure change per unit crank angle, the symbol is $\dot{P}_c$, the calculation formula is $$\dot{P}_c = \frac{dF_c}{d\varphi},$$

and the unit is Pascal per degree (Pa/°).

Cylinder pressure rise rate level: the result obtained by multiplying the logarithm based on 10 by 10 after the dividing the cylinder pressure rise rate $\dot{P}_c$ by the reference pressure rise rate $\dot{P}_{c0}$, the symbol is $L_{\dot{P}_c}$, the calculation formula is $$L_{\dot{P}_c} = 10\lg\left(\frac{\dot{P}_c^2}{\dot{P}_0^2}\right),$$

the unit is decibel (dB), and the reference sound pressure rise rate $\dot{P}_{c0}$ is $10^{-5}$ Pa/°.

Top surface cylinder force/bottom surface cylinder force: the pressure on the equivalent top surface/equivalent bottom surface in the cylinder, the symbol is $F_{top}$, and the calculation formula is $F_{top}=P_c \cdot S_{top}$, and the unit is Newton (N).

Top surface cylinder force level: the result obtained by multiplying the logarithm based on 10 by 10 after the dividing the square of the top surface cylinder force $F_{top}$ by the square of the reference force $F_0$, the calculation formula is $$L_{F_{top}} = 10 \lg\left(\frac{F_{top}'^2}{F_0^2}\right),$$

the unit is decibel (dB), and the reference force $F_0$ is $10^{-7}$ N.

Top surface cylinder force rise rate: the pressure change on the equivalent top surface in the cylinder per crank angle, the symbol is $\dot{F}_{top}$, the calculation formula is $$\dot{F}_{top} = \frac{dF_{top}}{d\varphi},$$

and the unit is Newton per degree (N/°).

Top surface cylinder force rise rate level: the result obtained by multiplying the logarithm based on 10 by 10 after the dividing the square of the top surface cylinder force rise rate $\dot{F}_{top}$ by the square of the reference force rise rate $\dot{F}_0$, the symbol is $L_{\dot{F}_{top}}$, the calculation formula is $$L_{\dot{F}_{top}} = 10 \lg\left(\frac{\dot{F}_{top}'^2}{\dot{F}_0^2}\right),$$

the unit is decibel (dB), and the reference force $\dot{F}_0$ is $10^{-7}$ N.

Side surface cylinder force: the pressure on the equivalent side surface in the cylinder, the symbol is $F_{side}$, and the calculation formula is $F_{side}=P_c \cdot S_{side}$, and the unit is Newton (N).

Side surface cylinder force level: the result obtained by multiplying the logarithm based on 10 by 10 after the dividing the square of the side surface cylinder force $F_{side}$ by the square of the reference force $F_0$, the calculation formula is $$L_{F_{side}} = 10 \lg\left(\frac{F_{side}'^2}{F_0^2}\right),$$

and the unit is decibel (dB).

Side surface cylinder force rise rate: the pressure change on the equivalent side surface in the cylinder per crank angle, the symbol is $\dot{F}_{side}$, the calculation formula is $$\dot{F}_{side} = \frac{dF_{side}}{d\varphi},$$

and the unit is Newton per degree (N/°).

Side surface cylinder force rise rate level: the result obtained by multiplying the logarithm based on 10 by 10 after the dividing the square of the side surface cylinder force rise rate $\dot{F}_{side}$ by the square of the reference force rise rate $\dot{F}_0$, the symbol is $L_{\dot{F}_{side}}$, the calculation formula is $$L_{\dot{F}_{side}} = 10 \lg\left(\frac{\dot{F}_{side}'^2}{\dot{F}_0^2}\right),$$

and the unit is decibel (dB).

Engine speed: the number of revolutions per minute of the engine, the symbol is n, and the unit is rpm.

Combustion noise sound pressure level: representing any combustion noise sound pressure level, and the symbol is $L_x$.

The method for determining the combustion noise parameters provided by the embodiment of the present application will be described below.

Referring to FIG. 1, the figure shows a flow chart of a method for determining combustion noise parameters provided by an embodiment of the present application. As shown in FIG. 1, the method comprises:

S101: Acquiring a cylinder pressure sequence, wherein the cylinder pressure sequence comprises cylinder pressures $P_c$ corresponding to different crank angles $\varphi$ and moments $t_\varphi$.

In the embodiment of the application, a cylinder pressure sequence can be acquired, wherein the cylinder pressure sequence can include cylinder pressures $P_c$ corresponding to different crank angles $\varphi$ and moments $t_\varphi$.

Next, the method of acquiring cylinder pressure sequence is introduced in detail.

Figure 2:
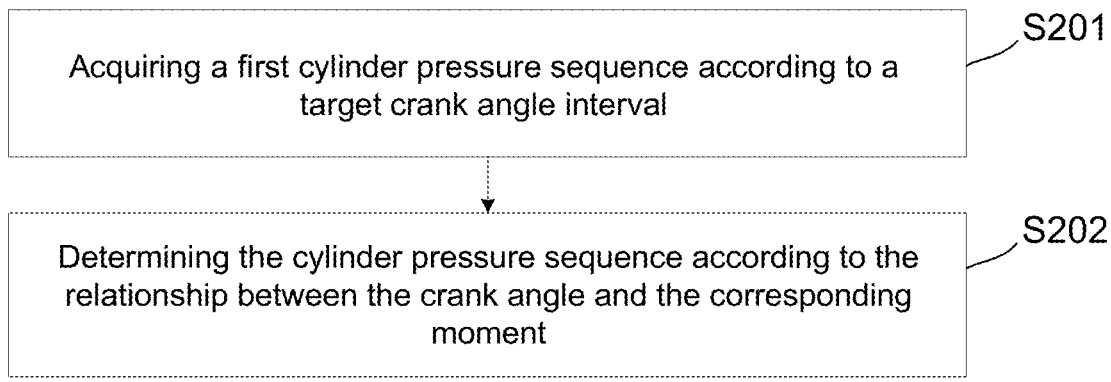
FIG. 2 is a flowchart of a method for acquiring a cylinder pressure sequence provided by an embodiment of the present application.

In one possible implementation, refer to FIG. 2, which shows a flowchart of a method for acquiring a cylinder pressure sequence provided by an embodiment of the present application. The method for acquiring a cylinder pressure sequence in S101 may include:

S201: Acquiring a first cylinder pressure sequence according to a target crank angle interval.

S202: Determining the cylinder pressure sequence according to the relationship between the crank angle and the corresponding moment.

In the embodiment of the present application, a crank angle interval may be preset as the target crank angle interval, for example, the determined target crank angle interval is the crank angle interval of 1 degree. Then, in the combustion process of combustible gas in the engine cylinder, one cylinder pressure can be obtained at every other target crank angle interval according to the determined target crank angle interval to obtain one cylinder pressure sequence as the first cylinder pressure sequence. It can be understood that each cylinder pressure in the obtained first cylinder pressure sequence corresponds to one crank angle.

In a specific implementation, the first cylinder pressure sequence can be measured by a cylinder pressure sensor.

The moment corresponding to the crank angle may refer to the time elapsed from the zero position of the crank angle to the current crank angle $\varphi$, and the relationship between the crank angle and the corresponding moment may refer to $\varphi=6nt_\varphi$, where n may refer to the rotational speed of the engine, and the unit of n may be revolutions per minute (rpm).

Then, according to the relationship between the crank angle and the corresponding moment, the corresponding moment is determined for the crank angle of each cylinder pressure in the first cylinder pressure sequence, so that the cylinder pressure sequence can be determined.

Figure 3:
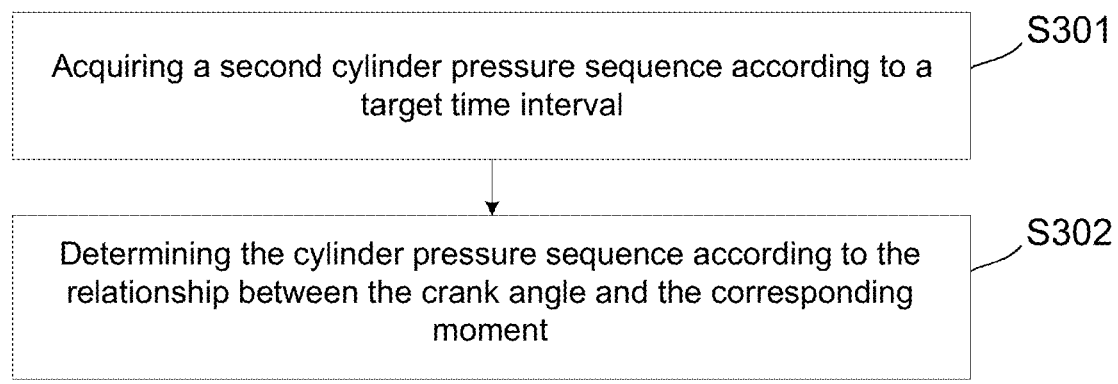
FIG. 3 is a flowchart of another method for acquiring a cylinder pressure sequence provided by an embodiment of the present application.

In one possible implementation, refer to FIG. 3, which shows a flow chart of another method for acquiring a cylinder pressure sequence provided by an embodiment of the present application. the method for acquiring a cylinder pressure sequence in S101 may include:

S301: Acquiring a second cylinder pressure sequence according to a target time interval.

S302: Determining the cylinder pressure sequence according to the relationship between the crank angle and the corresponding moment.

In the embodiment of the present application, one time interval may be preset as the target time interval, for example, the determined target time interval is (1/25600) seconds. Then, during the combustion of combustible gas in the engine cylinder, one cylinder pressure can be obtained at every other target time interval according to the determined target time interval to obtain one cylinder pressure sequence as the second cylinder pressure sequence. It can be understood that each cylinder pressure in the obtained second cylinder pressure sequence corresponds to one moment.

The relationship between the crank angle and the corresponding moment is described in S201-S202 and will not be described here.

Then, the corresponding crank angle can be determined for the moment of each cylinder pressure in the first cylinder pressure sequence according to the relationship between the crank angle and the corresponding moment, so that the cylinder pressure sequence can be determined.

It should be noted that the embodiment of the present application is not limited to the method of acquiring the cylinder pressure sequence in S101. For the above two modes, in one possible implementation, for the process of acquiring the first cylinder pressure sequence or the second cylinder pressure sequence, the position of the crankshaft when the highest cylinder pressure is reached for the first time in the cylinder may be set as the position of the crank angle $\varphi=0°$, that is, in the process of acquiring the first cylinder pressure sequence or the second cylinder pressure sequence, the position of the crankshaft when the highest cylinder pressure is reached for the first time in the cylinder may be set as the zero position of the crank angle. Then, the crank angle corresponding to the cylinder pressure in the cylinder pressure sequence is adjusted according to the angle offset based on the crank angle zero position.

Next, the method in S101 will be exemplified.

Figure 4:
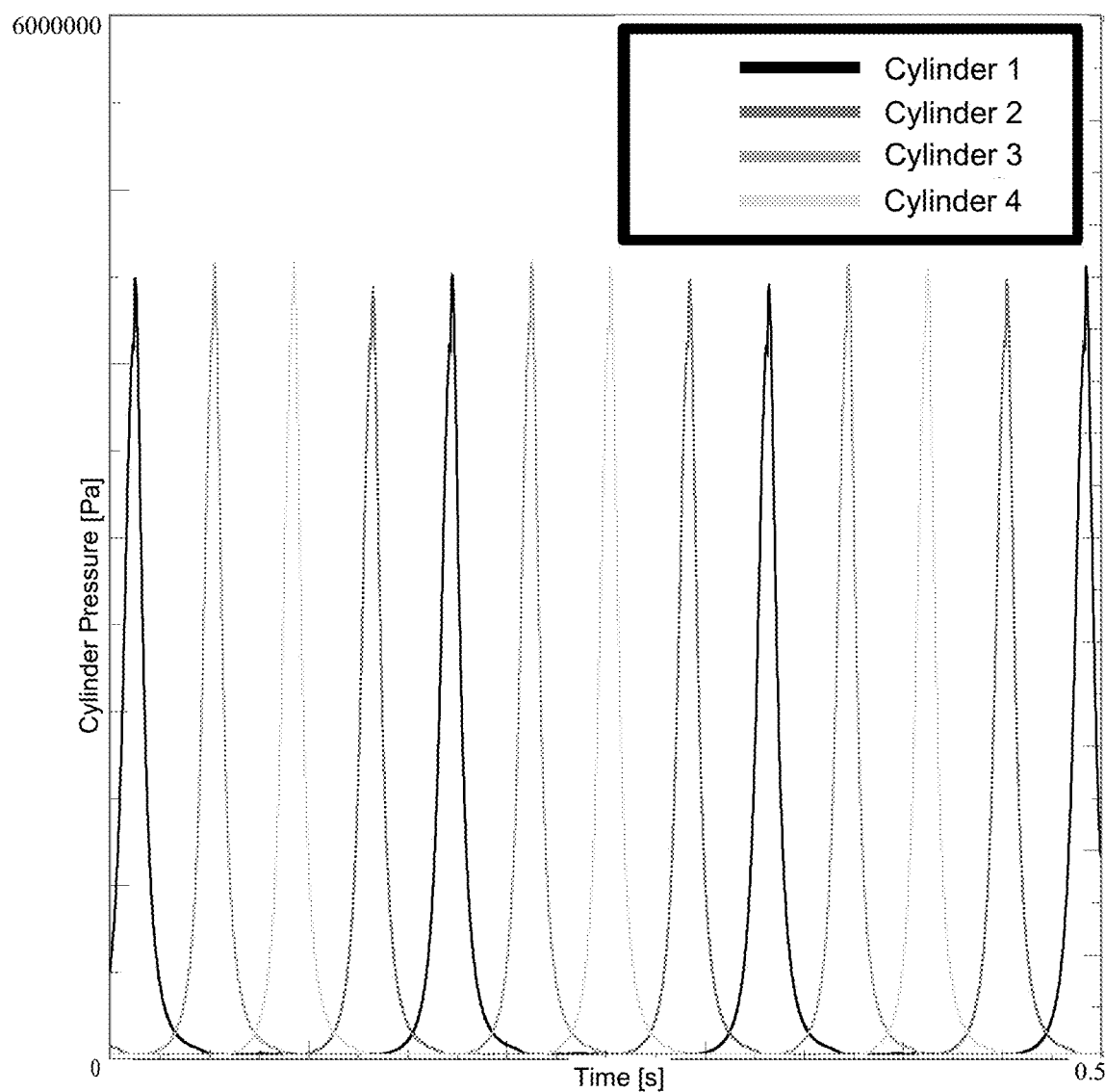
FIG. 4 is a time domain signal data diagram showing a firing sequence of a transmitter according to an embodiment of the present application.

In the embodiment of the present application, the method of S301-S302 (acquisition method of tracking time) is applied, and four groups of cylinder pressure sequences are acquired for four cylinders. Among them, the set target time interval is 0.5 seconds. By means of the cylinder pressure sensor, the cylinder pressure $P_c$ in the engine cylinder is measured according to a target time interval to obtain a time domain signal of the cylinder pressure as a second cylinder pressure sequence. The sampling bandwidth is 25600 Hz. Referring to FIG. 4 which shows a time domain signal data diagram showing the firing sequence of the engine provided by the embodiment of the present application, as shown in FIG. 4, the time domain signal data within 0.5 seconds is displayed in the diagram. As can be seen from FIG. 4, the firing sequence of the cylinders in the engine is as follows: cylinder 1, cylinder 3, cylinder 4 and cylinder 2.

By using $\varphi=6nt_\varphi$, the crank angle $\varphi$ corresponding to the time of each cylinder pressure in the second cylinder pressure sequence is calculated (n=750 rpm in this example). In this example, according to the firing sequence, the position of the crankshaft when each cylinder reaches the highest cylinder pressure for the first time is defined as the position where the crankshaft angle $\varphi=0$ degrees, and the crankshaft angle is appropriately offset and adjusted, where the crankshaft angle offset for the first cylinder is −58.5 degrees, the crankshaft angle offset for the second cylinder is −58.5 degrees to 540 degrees, the crankshaft angle offset for the third cylinder is −58.5 degrees to 180 degrees, and the crankshaft angle offset for the fourth cylinder is −58.5 degrees to 360 degrees.

S102: Calculating a first parameter sequence according to the cylinder pressure sequence, wherein the first parameter sequence is a parameter sequence in a time domain, and the first parameter sequence comprises one or more of a top surface cylinder force sequence, a top surface cylinder force rise rate sequence, a side surface cylinder force sequence and a side surface cylinder force rise rate sequence.

In the embodiment of the application, the first parameter sequence can be calculated according to the cylinder pressure sequence, wherein the first parameter sequence can include one or more of a top surface cylinder force sequence, a top surface cylinder force rise rate sequence, a side surface cylinder force sequence and a side surface cylinder force rise rate sequence.

Wherein if the calculated first parameter sequence includes a top surface cylinder force sequence, the way of obtaining the top surface cylinder force sequence includes: for each cylinder pressure $P_c$ in the cylinder pressure sequence, the corresponding top surface cylinder force $F_{top}$ can be calculated by $F_{top}=P_c \cdot S_{top}$, and after calculating the corresponding top surface cylinder force $F_{top}$ based on each cylinder pressure $P_c$ in the cylinder pressure sequence, the obtained top surface cylinder forces $F_{top}$ can be formed into a top surface cylinder force sequence.

If the calculated first parameter sequence includes a top surface cylinder force rise rate sequence, the way of obtaining the top surface cylinder force rise rate sequence includes: for each cylinder pressure $P_c$ in the cylinder pressure sequence, the corresponding top surface cylinder force rise rate $\dot{F}_{top}$ can be calculated by $$\dot{F}_{top} = \frac{dF_{top}}{d\varphi},$$

and after the corresponding top surface cylinder force rise rate $\dot{F}_{top}$ is calculated based on each cylinder pressure $P_c$ in the cylinder pressure sequence, the obtained top surface cylinder force rise rates $\dot{F}_{top}$ can be formed into a top surface cylinder force rise rate sequence.

If the calculated first parameter sequence includes a side surface cylinder force sequence, the way of obtaining the side surface cylinder force sequence includes: for each cylinder pressure $P_c$ in the cylinder pressure sequence, the corresponding side surface cylinder force $F_{side}$ can be calculated by $F_{side}=P_c \cdot S_{side}$, and after the corresponding side surface cylinder force $F_{side}$ is calculated based on each cylinder pressure $P_c$ in the cylinder pressure sequence, the obtained side surface cylinder forces $F_{side}$ can be formed into a side surface cylinder force sequence.

If the calculated first parameter sequence includes a side surface cylinder force rise rate sequence, the way of obtaining the side surface cylinder force rise rate sequence includes: for each cylinder pressure $P_c$ in the cylinder pressure sequence, the corresponding side surface cylinder force rise rate $\dot{F}_{side}$ can be calculated by $$\dot{F}_{side} = \frac{dF_{side}}{d\varphi},$$

and after the corresponding side surface cylinder force rise rate $\dot{F}_{side}$ is calculated based on each cylinder pressure $P_c$ in the cylinder pressure sequence, the obtained side surface cylinder force rise rates $\dot{F}_{side}$ can be formed into a side surface cylinder force rise rate sequence.

It should be noted that the principle of derivative calculation in the embodiment of the present application is that, as in $$\dot{P}_c = \frac{dP_c}{d\varphi},$$

adjacent cylinder pressures $P_c$ are applied for differential approximate calculation, and the adjacent cylinder pressures referred to herein may be cylinder pressures with adjacent crank angles or adjacent cylinder pressures at corresponding moments.

Based on the example in S101 described above, the method of S102 will be illustrated next.

In this example, the first parameter sequence calculated according to the cylinder pressure sequence may still include a cylinder pressure sequence, and the calculated first parameter sequence may further include a cylinder pressure rise rate sequence, a top surface cylinder force sequence, a top surface cylinder force rise rate sequence, a side surface cylinder force sequence, and a side surface cylinder force rise rate sequence.

Among them, the parameters of the four aforementioned cylinders are shown in Table 1.

TABLE 1

Parameters of four cylinders

| Name | Symbol | Unit | Value |
| --- | --- | --- | --- |
| Firing sequence |  |  | 1-3-4-2 |
| Cylinder diameter | D | mm | 83 |
| Strokes | 2r | mm | 92 |
| Connecting rod length | l | mm | 142 |
| Crank length | r | mm | 46 |
| Equivalent clearance height | δ | mm | 5 |

The method for calculating the cylinder pressure rise rate sequence is as follows: according to $$\dot{P}_c = \frac{dP_c}{d\varphi},$$

the corresponding cylinder pressure rise rate $\dot{P}_c$ is obtained, thus forming the cylinder pressure rise rate sequence.

According to $F_{top}=P_c \cdot S_{top}$ and $$S_{top} = \frac{\pi D^2}{4},$$

the corresponding top surface cylinder force $F_{top}$ is obtained to form the top surface cylinder force sequence.

The method for calculating the top surface cylinder force rise rate sequence is as follows: according to $$\dot{F}_{top} = \frac{dF_{top}}{d\varphi},$$

the corresponding top surface cylinder force rise rate $\dot{F}_{top}$ is obtained, thus forming the top surface cylinder force rise rate sequence.

The method for calculating the side surface cylinder force sequence is as follows: according to $F_{side}=P_c \cdot S_{side}$, $S_{side}=\pi D (\delta+l+r-r\cos\varphi - \sqrt{l^2-r^2\sin^2\varphi})$ and $$\delta = \frac{V_c}{S_t} = \frac{S}{\varepsilon - 1},$$

the corresponding side surface cylinder force $F_{side}$ is obtained, thus forming the side surface cylinder force sequence.

The method for calculating the side surface cylinder force rise rate sequence is as follows: according to $$\dot{F}_{side} = \frac{dF_{side}}{d\varphi},$$

the corresponding side surface cylinder force rise rate $\dot{F}_{side}$ is obtained, thus forming the side surface cylinder force rise rate sequence.

Figure 5:
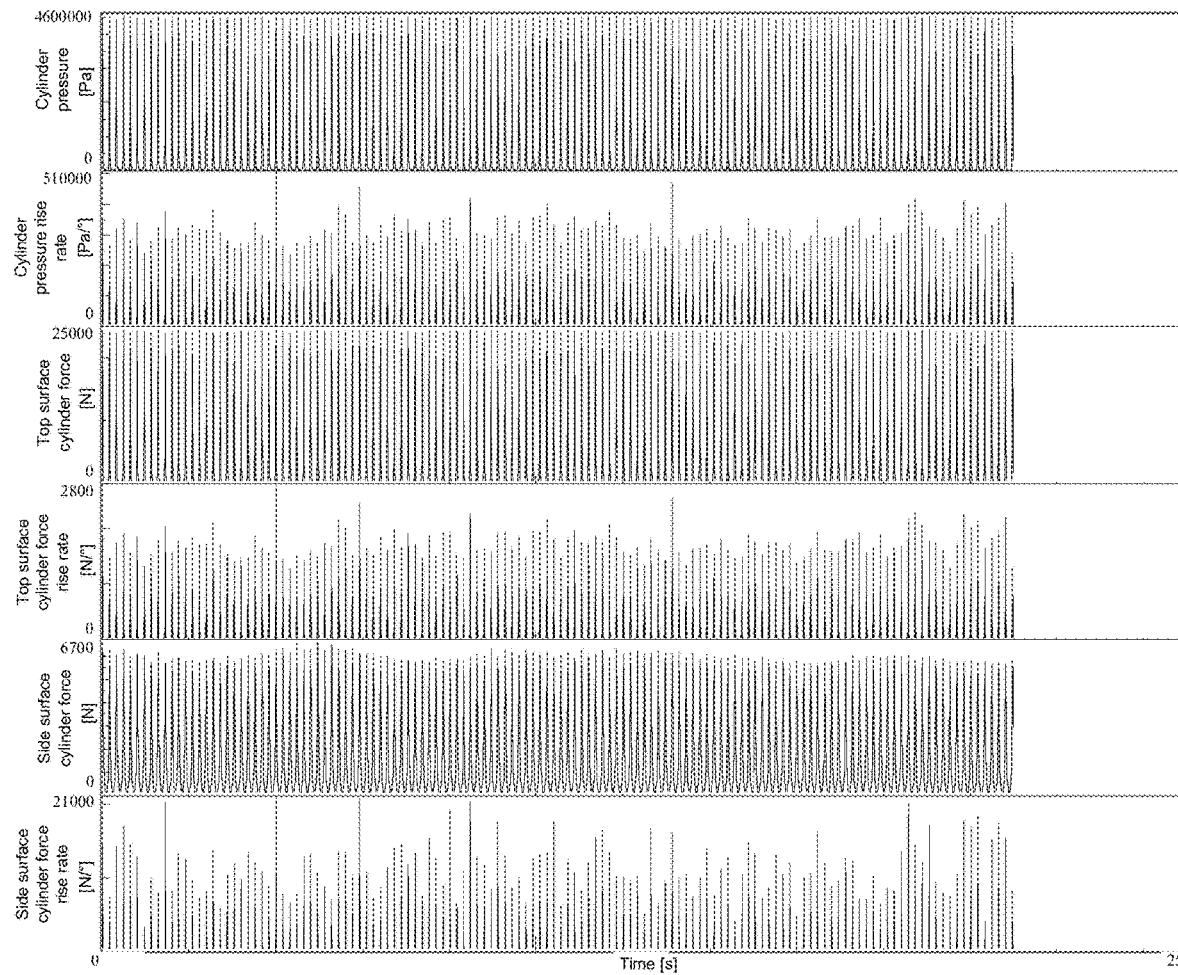
FIG. 5 is a time domain diagram corresponding to a first parameter sequence provided by an embodiment of the present application.

Then, the processed first parameter sequence can be saved into a table, and time domain diagrams can be drawn according to time for the data of each parameter sequence in the first parameter sequence. Referring to FIG. 5, this diagram shows a time domain diagram corresponding to a first parameter sequence provided by an embodiment of the present application, as shown in FIG. 5, the figure includes a time domain diagram corresponding to a cylinder pressure sequence, a time domain diagram corresponding to a cylinder pressure rise rate sequence, a time domain diagram corresponding to a top surface cylinder force sequence, a time domain diagram corresponding to a top surface cylinder force rise rate sequence, a time domain diagram corresponding to a side surface cylinder force sequence, and a time domain diagram corresponding to a side surface cylinder force rise rate sequence.

S103: Determining target parameters for representing combustion noise in the cylinder according to the first parameter sequence.

As can be seen from the above technical scheme, a cylinder pressure sequence is obtained, and the cylinder pressure sequence comprises cylinder pressures $P_c$ corresponding to different crank angles $\varphi$ and corresponding moments $t_\varphi$; calculating a first parameter sequence according to a cylinder pressure sequence, wherein the first parameter sequence is a parameter sequence in a time domain, and the first parameter sequence comprises one or more of a top surface cylinder force sequence, a top surface cylinder force rise rate sequence, a side surface cylinder force sequence and a side surface cylinder force rise rate sequence; the top surface cylinder force in the top surface cylinder force sequence is $F_{top}=P_c \cdot S_{top}$, the top surface cylinder force rise rate in the top surface cylinder force rise rate sequence is $$\dot{F}_{top} = \frac{dF_{top}}{d\varphi},$$

the side surface cylinder force in the side surface cylinder force sequence is $F_{side}=P_c \cdot S_{side}$, the side surface cylinder force rise rate in the side surface cylinder force rise rate sequence is $$\dot{F}_{side} = \frac{dF_{side}}{d\varphi};$$

$S_{top}$ is an equivalent area of a cylinder top surface and $S_{side}$ is an equivalent area of a cylinder side surface; and determining a target parameter for representing combustion noise in a cylinder according to the first parameter sequence. In the method, parameters such as top surface cylinder force, side surface cylinder force, top surface cylinder force rise rate and side surface cylinder force rise rate are added to further consider the excitation of the combustion of combustible gas in the cylinder to the cylinder in the time history, so that the determined target parameters representing the combustion noise in the cylinder are more accurate and perfect.

Figure 6:
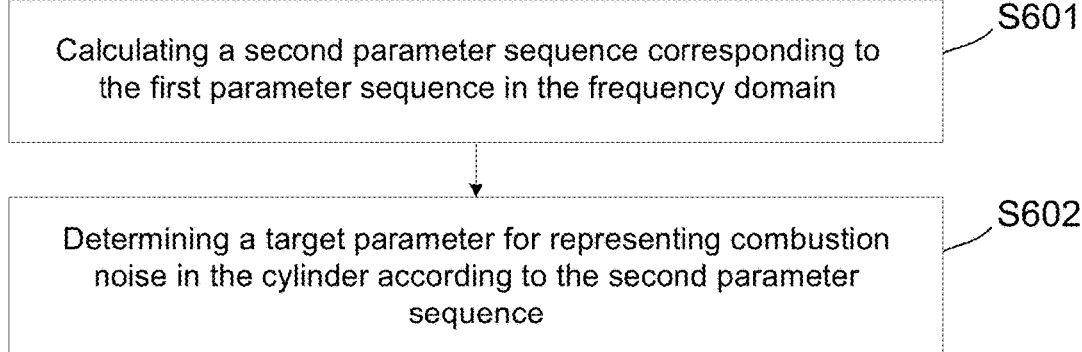
FIG. 6 is a flowchart of a method for determining a target parameter for representing combustion noise in a cylinder provided by an embodiment of the present application.

In one possible implementation, refer to FIG. 6, which shows a flowchart of a method for determining a target parameter for representing in-cylinder combustion noise provided by an embodiment of the present application, as shown in FIG. 6, the method for determining a target parameter for representing in-cylinder combustion noise according to a first parameter sequence in S103 may include:

S601: Calculating a second parameter sequence corresponding to the first parameter sequence in the frequency domain.

S602: Determining a target parameter for representing combustion noise in the cylinder according to the second parameter sequence.

In the embodiment of the present application, the first parameter sequence in the time domain can be converted into a corresponding parameter sequence in the frequency domain, and the first parameter sequence can be converted into a corresponding parameter sequence in the frequency domain as a second parameter sequence, thereby determining a target parameter for representing combustion noise in the cylinder according to the second parameter sequence.

In a specific implementation, a corresponding second parameter sequence can be obtained for each parameter sequence in the first parameter sequence by Fourier transform, that is, the numerical value of the parameter data in each parameter sequence in the frequency domain can be obtained.

In one possible implementation, refer to FIG. 7, which shows another method flow chart provided by the embodiment of the present application for determining a target parameter for representing in-cylinder combustion noise, as shown in FIG. 7, the method for determining a target parameter for representing in-cylinder combustion noise in S602 according to a second parameter sequence may include:

S701: Obtaining a corresponding third parameter sequence according to the second parameter sequence.

S702: Performing frequency weighting on the third parameter sequence to determine a target parameter for representing combustion noise in the cylinder.

In the embodiment of the application, if the first parameter sequence includes a top surface cylinder force sequence, the second parameter sequence includes a corresponding top surface cylinder force sequence in the frequency domain, so that a top surface cylinder force level $L_{F_{top}}$ corresponding to each parameter is obtained by $$L_{F_{top}} = 10\lg\left(\frac{F'^2_{top}}{F_0^2}\right)$$

according to each parameter data in the second parameter sequence, and the obtained top surface cylinder force levels $L_{F_{top}}$ are formed into a top surface cylinder force level sequence, so that the obtained third parameter sequence includes a corresponding top surface cylinder force level sequence. Among them, the top surface cylinder force level $L_{F_{top}}$ can be used as the combustion noise sound pressure level.

Then, the top surface cylinder force level sequence can be frequency weighted by frequency weighting to determine the corresponding top surface cylinder force value $L'_{F_{top}}$, which can be used as a target parameter to represent combustion noise in the cylinder.

The embodiment of the application provides two frequency weighting methods, namely an A-frequency weighting method and a Z frequency weighting method. The A-frequency weighting method can simulate the loudness of human ears to 40-square pure tones. When the signal passes, it can greatly attenuate the signals at low frequency and middle frequency (below 1000 Hz). The Z-frequency weighting method can be a non-weighting method.

If the first parameter sequence includes a side surface cylinder force sequence, the second parameter sequence includes a corresponding side surface cylinder force sequence in the frequency domain, so that the side surface cylinder force level $L_{F_{side}}$ corresponding to each parameter is obtained by $$L_{F_{side}} = 10\lg\left(\frac{F'^2_{side}}{F_0^2}\right)$$

according to each parameter data in the second parameter sequence, and the obtained side surface cylinder force levels $L_{F_{side}}$ are formed into a side surface cylinder force level sequence, so that the obtained third parameter sequence includes the corresponding side surface cylinder force level sequence. Among them, the side surface cylinder force level $L_{F_{side}}$ can be used as the combustion noise sound pressure level.

Then, the side surface cylinder force level sequence can be weighted by frequency to determine the corresponding side surface cylinder force value $L'_{F_{side}}$.

That is, if the first parameter sequence comprises a top surface cylinder force sequence and/or a side surface cylinder force sequence, the third parameter sequence obtained by using $$L_F = 10\lg\left(\frac{F'^2}{F_0^2}\right)$$

comprises a corresponding top surface cylinder force sequence and/or a side surface cylinder force sequence, and the target parameter comprises a corresponding top surface cylinder force value $L_{F_{top}}'$ and/or a side surface cylinder force value $L_{F_{side}}'$.

If the first parameter sequence includes a top surface cylinder force rise rate sequence and the second parameter sequence includes a corresponding top surface cylinder force rise rate sequence in the frequency domain, the top surface cylinder force rise rate level $L_{\dot{F}_{top}}$ corresponding to each parameter is obtained by $$L_{\dot{F}_{top}} = 10 \lg\left(\frac{\dot{F}_{top}'^2}{\dot{F}_0^2}\right)$$

according to each parameter data in the second parameter sequence, and the obtained top surface cylinder force rise rate levels $L_{\dot{F}_{top}}$ are formed into a top surface cylinder force rise rate level sequence, so that the obtained third parameter sequence includes a corresponding top surface cylinder force rise rate level sequence. Among them, the top surface cylinder force rise rate level $L_{\dot{F}_{top}}$ can be used as the combustion noise sound pressure level.

Then, frequency weighting can be carried out on the top surface cylinder force rise rate sequence by frequency weighting to determine the corresponding top surface cylinder force rise rate value $L'_{\dot{F}_{top}}$, which can be used as a target parameter for representing combustion noise in the cylinder.

If the first parameter sequence includes a side surface cylinder force rise rate sequence, the second parameter sequence includes a corresponding side surface cylinder force rise rate sequence in the frequency domain, so that the side surface cylinder force rise rate level $L_{\dot{F}_{side}}$ corresponding to each parameter is obtained by $$L_{\dot{F}_{side}} = 10 \lg\left(\frac{\dot{F}_{side}'^2}{\dot{F}_0^2}\right)$$

according to each parameter data in the second parameter sequence, and the obtained side surface cylinder force rise rate levels $L_{\dot{F}_{side}}$ are formed into a side surface cylinder force rise rate level sequence, so that the obtained third parameter sequence includes the corresponding side surface cylinder force rise rate level sequence. Among them, the side surface cylinder force rise rate level $L_{\dot{F}_{side}}$ can be used as the combustion noise sound pressure level.

Then, frequency weighting can be carried out on the side surface cylinder force rise rate sequence by frequency weighting to determine the corresponding side surface cylinder force rise rate value $L'_{\dot{F}_{side}}$, which can be used as a target parameter for representing combustion noise in the cylinder.

That is, if the first parameter sequence includes a top surface cylinder force rise rate sequence and/or a side surface cylinder force rise rate sequence, the obtained third parameter sequence includes a corresponding top surface cylinder force rise rate sequence and/or a side surface cylinder force rise rate sequence, and the target parameter includes a corresponding top surface cylinder force rise rate value $L'_{\dot{F}_{top}}$ and/or a side surface cylinder force rise rate value $L'_{\dot{F}_{side}}$.

Based on the example in the foregoing S102, the methods of S701-S702 will be illustrated next.

For the cylinder pressure sequence in the first parameter sequence, the second parameter sequence includes the corresponding cylinder pressure sequence in the frequency domain, so that the cylinder pressure level $L_{P_c}$ corresponding to each parameter is obtained by $$L_{P_c} = 10 \lg\left(\frac{P_c^2}{P_0^2}\right)$$

according to each parameter data in the second parameter sequence, and the obtained cylinder pressure levels $L_{P_c}$ are formed into the cylinder pressure level sequence, so that the obtained third parameter sequence includes the corresponding cylinder pressure level sequence. Among them, the cylinder pressure level $L_{P_c}$ can be used as the combustion noise sound pressure level.

For the cylinder pressure rise rate sequence in the first parameter sequence, the second parameter sequence includes the corresponding cylinder pressure rise rate sequence in the frequency domain, so that the cylinder pressure rise rate level $L_{\dot{P}_c}$ corresponding to each parameter is obtained by $$L_{\dot{P}_c} = 10 \lg\left(\frac{\dot{P}_c^2}{\dot{P}_0^2}\right)$$

according to each parameter data in the second parameter sequence, and the obtained cylinder pressure rise rate levels $L_{\dot{P}_c}$ are formed into the cylinder pressure rise rate level sequence, so that the obtained third parameter sequence includes the corresponding cylinder pressure rise rate level sequence. Among them, the cylinder pressure rise rate level $L_{\dot{P}_c}$ can be used as the combustion noise sound pressure level.

In addition, for the top surface cylinder force sequence, the top surface cylinder force rise rate sequence, the side surface cylinder force sequence and the side surface cylinder force rise rate sequence in the first parameter sequence, the corresponding top surface cylinder force level sequence, the top surface cylinder force rise rate sequence, the side surface cylinder force level sequence and the side surface cylinder force rise rate sequence can be determined according to the aforementioned manner, and will not be repeated here.

That is, the cylinder pressure level $L_{P_c}$, the cylinder pressure rise rate level $L_{\dot{P}_c}$, the top surface cylinder force level $L_{F_{top}}$, the top surface cylinder force rise rate level $L_{\dot{F}_{top}}$, the side surface cylinder force level $L_{F_{side}}$, and the side surface cylinder force rise rate level $L_{\dot{F}_{side}}$ provided by the embodiment of the present application can all be used as combustion noise sound pressure levels.

Then, referring to FIG. 8, the figure shows a schematic diagram for determining a comprehensive value corresponding to the combustion noise sound pressure level of a cylinder provided by the embodiment of the present application, as shown in FIG. 8, a ⅓ octave calculation method is applied to one of four cylinders to collectively calculate the dispersed energy of the six combustion noise sound pressure levels (i.e. cylinder pressure level, cylinder pressure rise rate level, top surface cylinder force level, top surface cylinder force rise rate level, side surface cylinder force level and side surface cylinder force rise rate level) of the cylinder into the central frequency band of the octave, and the above six combustion noise sound pressure levels of each cylinder are simultaneously calculated by adopting an A-frequency weighting method, so that the comprehensive values corresponding to each combustion noise sound pressure level (i.e. cylinder pressure value, cylinder pressure rise rate value, top surface cylinder force value, top surface cylinder force rise rate value, side surface cylinder force value and side surface cylinder force value) can be obtained.

In addition, for the remaining three of the four cylinders, the comprehensive value corresponding to each combustion noise sound pressure level can be determined by applying the method corresponding to FIG. 8. Therefore, the obtained comprehensive values corresponding to the combustion noise sound pressure levels of the four cylinders are shown in Table 2.

TABLE 2

Comprehensive values corresponding to combustion noise sound pressure levels of four cylinders

|  | $L'_{P_c}$ | $L'_{\dot{P}_c}$ | $L'_{F_{top}}$ | $L'_{\dot{F}_{top}}$ | $L'_{F_{side}}$ | $L'_{\dot{F}_{side}}$ |
|---|---|---|---|---|---|---|
| Cylinder 1 | 178.13 | 82.13 | 38.82 | 36.79 | 36.79 | 24.21 |
| Cylinder 2 | 177.87 | 78.70 | 38.56 | 33.36 | 33.36 | 23.87 |
| Cylinder 3 | 177.91 | 78.12 | 38.60 | 32.78 | 32.78 | 23.78 |
| Cylinder 4 | 177.81 | 77.24 | 38.50 | 31.90 | 31.90 | 47.90 |

According to the technical scheme provided by the embodiment of the application, the method for determining the combustion noise parameter provided by the embodiment of the application not only considers the combustion noise parameter in the related technology, but also further considers the structural parameter of the engine cylinder, and further considers further describing the combustion noise by using the top surface cylinder force, the top surface cylinder force rise rate, the side surface cylinder force and the side surface cylinder force rise rate, so that the objective description of the combustion noise is more in line with the actual listening feeling of people, and the subjective feeling of the human body on the combustion noise is more objectively quantified.

The method does not add more burden to the related technology, so the application surface of the method is the same as that of the related technology. The method can also be conveniently integrated into the test front end, so that the test equipment can directly output the test results of combustion noise.

Figure 9:
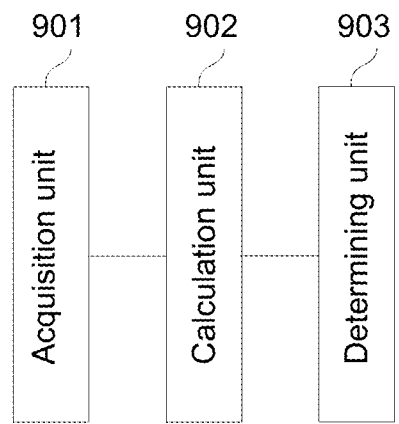
FIG. 9 is a structural diagram of a device for determining combustion noise parameters provided by an embodiment of the present application.

The embodiment of the present application also provides a device for determining the combustion noise parameter. refer to FIG. 9, which shows a structural diagram of a device for determining the combustion noise parameter provided by the embodiment of the present application, the device includes:

an acquisition unit 901, configured to acquire a cylinder pressure sequence, wherein the cylinder pressure sequence includes cylinder pressures $P_c$ corresponding to different crank angles $\varphi$ and corresponding moments $t_\varphi$;

a calculation unit 902, configured to calculate a first parameter sequence according to the cylinder pressure sequence, wherein the first parameter sequence is a parameter sequence in a time domain, and the first parameter sequence includes one or more of a top surface cylinder force sequence, a top surface cylinder force rise rate sequence, a side surface cylinder force sequence, and a side surface cylinder force rise rate sequence;

wherein the top surface cylinder force in the top surface cylinder force sequence is $F_{top}=P_c \cdot S_{top}$, the top surface cylinder force rise rate in the top surface cylinder force rise rate sequence is $$\dot{F}_{top} = \frac{dF_{top}}{d\varphi},$$

the side surface cylinder force in the side surface cylinder force sequence is $F_{side}=P_c \cdot S_{side}$, the side surface cylinder force rise rate in the side surface cylinder force rise rate sequence is $$\dot{F}_{side} = \frac{dF_{side}}{d\varphi};$$

$S_{top}$ is an equivalent area of a cylinder top surface and $S_{side}$ is an equivalent area of a cylinder side surface; and a determining unit 903, configured to determine a target parameter for representing combustion noise in the cylinder according to the first parameter sequence.

In one possible implementation, the determination unit 903 is specifically configured to:

calculate a second parameter sequence corresponding to the first parameter sequence in a frequency domain; and determine a target parameter for representing combustion noise in the cylinder according to the second parameter sequence.

In one possible implementation, the determining unit 903 is further specifically configured to:

obtain a corresponding third parameter sequence according to the second parameter sequence; and perform frequency weighting on the third parameter sequence to determine a target parameter for representing combustion noise in a cylinder;

wherein if the first parameter sequence comprises a top surface cylinder force sequence and/or a side surface cylinder force sequence, the third parameter sequence obtained by using $$L_F = 10 \lg\left(\frac{F'^2}{F_0^2}\right)$$

comprises a corresponding top surface cylinder force level sequence and/or a side surface cylinder force level sequence, the target parameter comprises a corresponding top surface cylinder force value $L_{F_{top}}'$ and/or a side surface cylinder force value $L_{F_{side}}'$, and $F_0$ is a reference force;

if the first parameter sequence comprises a top surface cylinder force rise rate sequence and/or a side surface cylinder force rise rate sequence, the third parameter sequence obtained by using $$L_{\dot{F}} = 10 \lg\left(\frac{\dot{F}'^2}{\dot{F}_0^2}\right)$$

comprises a corresponding top surface cylinder force rise rate sequence and/or a side surface cylinder force rise rate sequence, and the target parameter comprises a corresponding top surface cylinder force rise rate value $L_{\dot{F}_{top}}'$ and/or a side surface cylinder force rise rate value $L_{\dot{F}_{side}}'$, and $\dot{F}_0$ is a reference force rise rate.

In one possible implementation, the acquisition unit 901 is specifically configured to:

acquire a first cylinder pressure sequence according to a target crank angle interval; and determine the cylinder pressure sequence according to the relationship between the crank angle and the corresponding moment;

or,
    acquire a second cylinder pressure sequence according to a target time interval; and
    determine the cylinder pressure sequence according to the relationship between the crank angle and the corresponding moment.

In one possible implementation, the acquisition unit 901 is specifically configured to:
    setting the position of the crankshaft when the highest cylinder pressure is reached for the first time in the cylinder as the position of the crank angle φ=0°, for the process of acquiring said first cylinder pressure sequence or said second cylinder pressure sequence.

As can be seen from the above technical scheme, a cylinder pressure sequence is obtained, and the cylinder pressure sequence comprises cylinder pressures $P_c$ corresponding to different crank angles φ and corresponding moments $t_φ$;
    calculating a first parameter sequence according to a cylinder pressure sequence, wherein the first parameter sequence is a parameter sequence in a time domain, and the first parameter sequence comprises one or more of a top surface cylinder force sequence, a top surface cylinder force rise rate sequence, a side surface cylinder force sequence and a side surface cylinder force rise rate sequence; the top surface cylinder force in top surface cylinder force sequence is $F_{top}=P_c \cdot S_{top}$, the top surface cylinder force rise rate in top surface cylinder force rise rate sequence is $$\dot{F}_{top} = \frac{dF_{top}}{d\varphi},$$

the side surface cylinder force in side surface cylinder force sequence is $F_{side}=P_c \cdot S_{side}$, the side surface cylinder force rise rate in side surface cylinder force rise rate sequence is $$\dot{F}_{side} = \frac{dF_{side}}{d\varphi};$$

$S_{top}$ is the equivalent area of the cylinder top surface, and $S_{side}$ is the equivalent area of the cylinder side surface; according to the first parameter sequence, a target parameter for representing combustion noise in the cylinder is determined. In the method, parameters such as top surface cylinder force, side surface cylinder force, top surface cylinder force rise rate and side surface cylinder force rise rate are added to further consider the excitation of the combustion of combustible gas in the cylinder to the cylinder in the time history, so that the determined target parameters representing the combustion noise in the cylinder are more accurate and perfect.

From the description of the above embodiments, it is clear to those skilled in the art that all or part of the steps in the method of the above embodiments can be implemented by means of software plus necessary general hardware platforms. Based on this understanding, the technical solution of the present application can be embodied in the form of a software product, which can be stored in a storage medium such as ROM/RAM, magnetic disk, optical disk, etc., and includes several instructions to cause a computer device (which can be a personal computer, a server, or a network communication device such as a media gateway, etc.) to perform the methods described in various embodiments or some parts of embodiments of the present application.

It should be noted that various embodiments in this specification are described in a progressive manner, and each embodiment focuses on the differences from other embodiments, and the same similar parts between various embodiments can be referred to each other. For the device disclosed in the embodiment, since it corresponds to the method disclosed in the embodiment, the description is relatively simple, and the relevant parts can be explained in the method section.

It should also be noted that in this document, relational terms such as first and second, etc. are only used to distinguish one entity or operation from another entity or operation, and do not necessarily require or imply any such actual relationship or order between these entities or operations. Moreover, the terms "comprising", "including" or any other variation thereof are intended to cover a non-exclusive inclusion, such that a process, method, article, or apparatus that comprises a list of elements does not include only those elements but also other elements not expressly listed or inherent to such process, method, article, or apparatus. Without further limitation, an element defined by the statement "including" does not exclude the presence of another identical element in a process, method, article or device that includes the element.

The above description of the disclosed embodiments enables those skilled in the art to make or use the present application. Various modifications to these embodiments will be apparent to those skilled in the art, and the general principles defined herein may be implemented in other embodiments without departing from the spirit or scope of the present application. Therefore, this application is not to be limited to the embodiments shown herein but is to be accorded the widest scope consistent with the principles and novel features disclosed herein.

The invention claimed is:

1. A method for determining combustion noise parameters, characterized in that said method comprises:
    acquiring a cylinder pressure sequence, wherein said cylinder pressure sequence comprises cylinder pressures corresponding to different crank angles φ and corresponding moments $t_φ$;
    calculating a first parameter sequence according to said cylinder pressure sequence, wherein said first parameter sequence is a parameter sequence in a time domain, and said first parameter sequence comprises one or more of a top surface cylinder force sequence, a top surface cylinder force rise rate sequence, a side surface cylinder force sequence and a side surface cylinder force rise rate sequence;
    wherein the top surface cylinder force in said top surface cylinder force sequence is $F_{top}=P_c \cdot S_{top}$, the top surface cylinder force rise rate in said top surface cylinder force rise rate sequence is $$\dot{F}_{top} = \frac{dF_{top}}{d\varphi},$$

the side surface cylinder force in said side surface cylinder force sequence is $F_{side}=P_c \cdot S_{side}$, the side surface cylinder force rise rate in said side surface cylinder force rise rate sequence is $$\dot{F}_{side} = \frac{dF_{side}}{d\varphi};$$

$S_{top}$ is an equivalent area of a cylinder top surface and $S_{side}$ is an equivalent area of a cylinder side surface; and determining a target parameter for representing combustion noise in a cylinder according to said first parameter sequence.

2. The method according to claim 1, characterized in that determining the target parameter for representing combustion noise in the cylinder according to said first parameter sequence comprises:

calculating a second parameter sequence corresponding to said first parameter sequence in a frequency domain; and determining the target parameter for representing combustion noise in the cylinder according to said second parameter sequence.

3. The method according to claim 2, characterized in that determining the target parameter for representing combustion noise in the cylinder according to said second parameter sequence comprises:

obtaining a corresponding third parameter sequence according to said second parameter sequence;

performing frequency weighting on said third parameter sequence to determine a target parameter for representing combustion noise in a cylinder;

wherein if said first parameter sequence comprises a top surface cylinder force sequence and/or a side surface cylinder force sequence, said third parameter sequence obtained by using $$L_F = 10 \lg\left(\frac{F'^2}{F_0^2}\right)$$

comprises a corresponding top surface cylinder force level sequence and/or a side surface cylinder force level sequence, said target parameter comprises a corresponding top surface cylinder force value $L_{F_{top}}'$ and/or a side surface cylinder force value $L_{F_{side}}'$, and $F_0$ is a reference force;

if said first parameter sequence comprises a top surface cylinder force rise rate sequence and/or a side surface cylinder force rise rate sequence, said third parameter sequence obtained by using $$L_{\dot{F}} = 10 \lg\left(\frac{\dot{F}'^2}{\dot{F}_0^2}\right)$$

comprises a corresponding top surface cylinder force rise rate sequence and/or a side surface cylinder force rise rate sequence, and said target parameter comprises a corresponding top surface cylinder force rise rate value $L_{\dot{F}_{top}}'$ and/or a side surface cylinder force rise rate value $L_{\dot{F}_{side}}'$, and $\dot{F}_0$ is a reference force rise rate.

4. The method according to claim 1, characterized in that acquiring the cylinder pressure sequence comprises:

acquiring a first cylinder pressure sequence according to a target crank angle interval;

determining said cylinder pressure sequence according to the relationship between the crank angle and the corresponding moment;

or, acquiring a second cylinder pressure sequence according to a target time interval;

determining said cylinder pressure sequence according to the relationship between said crank angle and the corresponding moment.

5. The method of claim 4, characterized by further comprising:

setting the position of the crankshaft when the highest cylinder pressure is reached for the first time in the cylinder as the position of the crank angle φ=0°, for the process of acquiring said first cylinder pressure sequence or said second cylinder pressure sequence.

6. A device for determining combustion noise parameters, characterized in that the device comprises:

an acquisition unit configured to acquire a cylinder pressure sequence including cylinder pressures $P_c$ corresponding to different crank angles φ and corresponding moments $t_φ$;

a calculation unit configured to calculate a first parameter sequence according to the cylinder pressure sequence, wherein said first parameter sequence is a parameter sequence in a time domain, and said first parameter sequence comprises one or more of a top surface cylinder force sequence, a top surface cylinder force rise rate sequence, a side surface cylinder force sequence and a side surface cylinder force rise rate sequence;

wherein the top surface cylinder force in said top surface cylinder force sequence is $F_{top}=P_c \cdot S_{top}$, the top surface cylinder force rise rate in said top surface cylinder force rise rate sequence is $$\dot{F}_{top} = \frac{dF_{top}}{d\varphi},$$

the side surface cylinder force in said side surface cylinder force sequence is $F_{side}=P_c \cdot S_{side}$, and the side surface cylinder force rise rate in said side surface cylinder force rise rate sequence is $$\dot{F}_{side} = \frac{dF_{side}}{d\varphi};$$

$S_{top}$ is the equivalent area of the cylinder top surface and $S_{side}$ is the equivalent area of the cylinder side surface;

a determination unit configured to determine a target parameter for representing combustion noise in a cylinder according to the first parameter sequence.

7. The device according to claim 6, characterized in that the determining unit is specifically configured to:

calculate a second parameter sequence corresponding to said first parameter sequence in a frequency domain;

determine a target parameter for representing combustion noise in the cylinder according to the second parameter sequence.

8. The device according to claim 7, characterized in that said determining unit is further specifically configured to:

obtain a corresponding third parameter sequence according to said second parameter sequence;

perform frequency weighting on said third parameter sequence to determine a target parameter for representing combustion noise in a cylinder;

wherein if said first parameter sequence comprises a top surface cylinder force sequence and/or a side surface cylinder force sequence, said third parameter sequence obtained by using $$L_F = 10\lg\left(\frac{F'^2}{F_0^2}\right)$$

comprises a corresponding top surface cylinder force sequence and/or a side surface cylinder force sequence, said target parameter comprises a corresponding top surface cylinder force value $L_{F_{top}}'$ and/or a side surface cylinder force value $L_{F_{side}}'$, and $F_0$ is a reference force;

if said first parameter sequence comprises a top surface cylinder force rise rate sequence and/or a side surface cylinder force rise rate sequence, said third parameter sequence obtained by using $$L_{\dot{F}} = 10\lg\left(\frac{\dot{F}'^2}{\dot{F}_0^2}\right)$$

comprises a corresponding top surface cylinder force rise rate sequence and/or a side surface cylinder force rise rate sequence, and said target parameter comprises a corresponding top surface cylinder force rise rate value $L_{\dot{F}_{top}}'$ and/or a side surface cylinder force rise rate value $L_{\dot{F}_{top}}'$, wherein $\dot{F}_0$ is a reference force rise rate.

9. The device according to claim 6, characterized in that said acquisition unit is specifically configured to:
  acquire a first cylinder pressure sequence according to a target crank angle interval;
  determine said cylinder pressure sequence according to the relationship between the crank angle and the corresponding moment;
  or,
  acquire a second cylinder pressure sequence according to a target time interval;
  determine said cylinder pressure sequence according to the relationship between said crank angle and the corresponding moment.

10. The device according to claim 9, characterized in that the acquisition unit is specifically configured to:
  set the position of the crankshaft when the highest cylinder pressure is reached for the first time in the cylinder as the position of the crank angle $\varphi=0°$, for the process of acquiring said first cylinder pressure sequence or said second cylinder pressure sequence.

* * * * *